United States Patent
Ledet

(10) Patent No.: US 10,612,933 B1
(45) Date of Patent: Apr. 7, 2020

(54) POWER MAXIMIZATION

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 55 days.

(21) Appl. No.: 15/940,479

(22) Filed: Mar. 29, 2018

Related U.S. Application Data

(60) Provisional application No. 62/478,294, filed on Mar. 29, 2017.

(51) Int. Cl.
  *G01C 21/34* (2006.01)
  *B60L 58/12* (2019.01)
  *G01C 21/36* (2006.01)
  *B60L 1/00* (2006.01)

(52) U.S. Cl.
  CPC .......... *G01C 21/3415* (2013.01); *B60L 58/12* (2019.02); *G01C 21/3469* (2013.01); *G01C 21/3697* (2013.01); *B60L 1/00* (2013.01); *B60L 2240/62* (2013.01)

(58) Field of Classification Search
  CPC ............ G01C 21/3415; G01C 21/3697; G01C 21/3469; B60L 58/12; B60L 1/00; B60L 2240/62
  See application file for complete search history.

(56) References Cited

U.S. PATENT DOCUMENTS

| | | | | |
|---|---|---|---|---|
| 5,790,976 A | * | 8/1998 | Boll | B60L 3/12 455/456.5 |
| 2006/0129315 A1 | * | 6/2006 | Kanematsu | G01C 21/3461 340/995.1 |
| 2008/0254936 A1 | * | 10/2008 | Yang | B60K 1/02 477/5 |
| 2010/0324765 A1 | * | 12/2010 | Iida | B60L 58/25 701/22 |
| 2012/0179319 A1 | * | 7/2012 | Gilman | B60W 50/0097 701/22 |
| 2012/0232730 A1 | * | 9/2012 | Sujan | B60W 10/06 701/22 |
| 2012/0316774 A1 | | 12/2012 | Yariv et al. | |

(Continued)

FOREIGN PATENT DOCUMENTS

JP 2016-146656 * 7/2016 .......... B60L 15/2045

*Primary Examiner* — Frederick M Brushaber

(57) ABSTRACT

An example system may include one or more of a transport, a navigation system in the transport, wherein the navigation system is configured to obtain a current destination, a processor communicably coupled to the navigation system, wherein the processor is configured to determine whether the transport has battery charge to arrive at a final destination, and an application communicably coupled to the processor configured to determine elements that affect a range of the transport, when the processor determines that the battery charge is insufficient to arrive at the final destination, the processor is configured to: provide a notification of the insufficiency of the battery charge, provide details of one or more of the elements, process a modification of the one or more of the elements, and provide a notification of a sufficiency of the battery charge to arrive at the final destination.

18 Claims, 12 Drawing Sheets

(56) References Cited

U.S. PATENT DOCUMENTS

| | | | |
|---|---|---|---|
| 2013/0226441 A1* | 8/2013 | Horita | G01C 21/3469 701/118 |
| 2015/0069969 A1* | 3/2015 | Wu | H02J 7/0047 320/109 |
| 2016/0236586 A1* | 8/2016 | Soo | B60L 11/1862 |
| 2018/0029500 A1* | 2/2018 | Katanoda | B60W 20/11 |
| 2018/0173219 A1* | 6/2018 | Lee | B60W 50/082 |

* cited by examiner

| Phase | Temperature (degrees C/F) | Additional Power Used By Air Conditioner (kW) |
|---|---|---|
| 1 | 24/76 | .25 |
| 2 | 28/83 | .50 |
| 3 | 32/90 | .75 |
| 4 | 36/97 | 1.00 |
| 5 | 40/104 | 1.40 |

POWER MAXIMIZATION

TECHNICAL FIELD

This application generally relates to electric transports, and more particularly to power maximization in electric transports.

BACKGROUND

With electric transports sales climbing, users are starting to look at electric transports as a viable driving option. Yet there are still concerns surrounding electric transports for potential buyers. Mostly, those concerns center around the range and charging time of the batteries. Range anxiety is common among drivers of electric transports, this is the anxiety of having a transport that does not have a range in comparison to transports that are based on fossil fuel. Added to this is the availability of charging stations. Charging stations are not as popular as fossil fuel stations by a long shot. This causes anxiety for the driver. In the current market, the amount of time to charge the transport is decreasing, but probably not as quickly as drivers would like. In the meantime, options from the past are showing up, such as battery swapping. Which option users choose depends on a few key factors, such as battery cost and charging/swapping time. Mostly, however, it comes down to the drivers and their habits.

While there have been breakthroughs in batter charging time, the decrease in charging times are often small steps forward or spotlighting batteries designed for lower-voltage applications such as cellphones or laptops. Electric transport battery performance does seem to be increasing and different options exist that offer management of the charge of the transport.

SUMMARY

One example embodiment may provide a method that includes at least one of obtaining a current destination by a navigation system in a transport, determining whether the transport has battery charge to arrive at a final destination by a processor communicably coupled to the navigation system determining elements that affect a range of the transport by an application communicably coupled to the processor, determining by the processor that the battery charge is insufficient to arrive at the final destination, wherein the processor is configured to perform: providing a notification of the insufficiency of the battery charge, providing details of one or more of the elements, processing a modification of the one or more of the elements, and providing a notification of a sufficiency of the battery charge to arrive at the final destination.

Another example embodiment may provide a system that may include one or more of a transport, a navigation system in the transport, wherein the navigation system is configured to obtain a current destination, a processor communicably coupled to the navigation system, wherein the processor is configured to determine whether the transport has battery charge to arrive at a final destination, and an application communicably coupled to the processor configured to determine elements that affect a range of the transport, when the processor determines that the battery charge is insufficient to arrive at the final destination, the processor is configured to: provide a notification of the insufficiency of the battery charge, provide details of one or more of the elements, process a modification of the one or more of the elements, and provide a notification of a sufficiency of the battery charge to arrive at the final destination.

A further example embodiment may provide a non-transitory computer readable medium comprising instructions, that when read by a processor, cause the processor to perform: obtaining a current destination by a navigation system in a transport, determining whether the transport has battery charge to arrive at a final destination by a processor communicably coupled to the navigation system, determining elements that affect a range of the transport by an application communicably coupled to the processor, determining by the processor that the battery charge is insufficient to arrive at the final destination, wherein the processor is configured to perform: providing a notification of the insufficiency of the battery charge, providing details of one or more of the elements, processing a modification of the one or more of the elements, and providing a notification of a sufficiency of the battery charge to arrive at the final destination.

DETAILED DESCRIPTION

Figure 1:
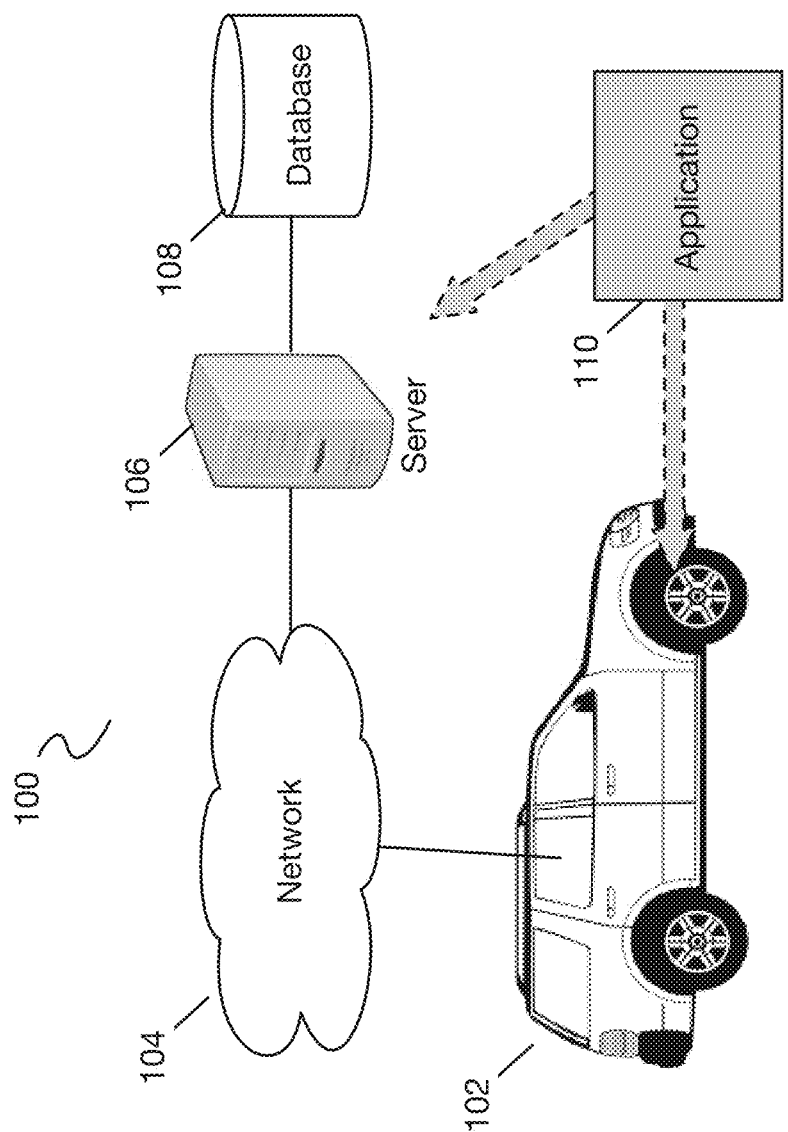
FIG. 1 illustrates a configuration of a system for power maximization according to a first embodiment of the application.

The present application will now be described in detail with reference to the drawings, which are provided as illustrative examples of the application so as to enable those skilled in the art to practice the application. Notably, the figures and examples below are not meant to limit the scope of the present application to a single embodiment, but other embodiments are possible by way of interchange of some or all of the described or illustrated elements.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Solutions are introduced pertaining to transports that are non-traditional in the fuel burning sense. Hybrid and all-electric transports fall into this category. The current application seeks to notify the driver and/or passengers of methods to increase the mileage of the transport, particularly when the increasing of mileage allows for the transport to arrive at the determined destination on the existing available energy.

Embodiments are disclosed that describe the current application's determining the proposed destination, elements that may affect the consumption of energy on the path to the destination, the actions that may increase the consumption of energy, among other items.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

With reference to FIG. 1, a diagram of the system of the current application is shown in one embodiment of the current application 100.

The present application, in the form of software for example executing on the current application 110 residing in a transport 102 and/or a server 106. The current invention offers a solution related to a transport wherein a transport may be an automobile, airplane, train, bus, boat, or any type of vehicle that normally transports people and/or goods from one place to another.

The application may exist as part of the transport and/or on a device inside or near the transport, such as a mobile device or any other device containing a processor and memory. The software may be included in the transport 102 such as part of a computer, which is a computer installed on the transport, henceforth referred to as the transport computer and/or server 106 or may be downloaded from a remote source, for example a server 106. A device executing the application 110 may be any device that contains a processor and memory. The present application in the form of software, for example may alternately reside on the device 102/106 that may be any of a mobile laptop device and/or a personal desktop computer or a mobile device. The computing device is connected to the Network 104 (which may be the Internet or any other type of network) through wired or wireless communication. It should be noted that other types of devices, in addition to devices 102/106, might be used with the present application. For example, a PDA, an MP3 player or any other wireless device, a gaming device (such as a hand-held system or home-based system) and the like (including a P.C. or other wired device) that can transmit and receive information may be used with the present application.

The user of the application may interface with the device of the transport 102 and connect through the Network 104 to the server 106. The server may be redundant or be more than a single entity without deviating from the scope of the application. A database 108 is directly connected to the server or connected remotely through the Network without deviating from the scope of the application.

If the application of the current application resides on a device, the application of the current application is downloaded through a platform (such as an application store or market) residing on the device or accessed via the device or may be accessed through the device's browser communicably coupled to the Network 104. Further, the application of the current application may be pre-loaded on the device or automatically loaded based on the location of the device, attributes of the user and/or of the device and the like.

The current application may work entirely or partially with any device such as a personal computer, a laptop, a personal computing tablet, a smartphone, a PDA, a watch, glasses or any device with a processor and memory.

The application of the instant invention may be part of the transport's 102 navigation system containing the destination or may interface with the transport's navigation system where messaging exists between the device executing the current application 110 and the navigation system which is part of the transport 102 and/or part of the client device's navigational application.

Navigation systems allow the user to enter a destination and obtain multiple routes. The navigation may be altered based on current traffic conditions where the user is notified of any recommendations during the route.

Certain factors may affect the amount of energy required to reach the destination. Factors existing outside of the list presented herein may be determined where functionality of the current application applies without deviating from the scope of the current application 110.

Current traffic scenarios may impact the use of energy of a transport. As the traffic congestion increases, the time to destination increases, which causes the increase in battery power.

Mapping applications usually include functionality to handle the current traffic scenario. Popular mapping applications, which are used by millions of people around the world, provide feedback that allows real-time analysis of road conditions, which include current traffic patterns.

Mobile devices that have the mapping application open or location services turned on send anonymous bits of data back to the server, allowing the calculation of the total number of transports, and how fast they are going on a road at any given time. This data is used to determine congestion on a highway for example. The accuracy of the data is greater with more people using the application.

As an example, a common Mapping application provides a trafficLayer class that allows the directions to utilize the current traffic conditions and provide routing options and modifications of the time of arrival given the current traffic.

```
var trafficLayer;
...
if (!trafficLayer||!trafficLayer.setMap)
trafficLayer=new google.maps.TrafficLayer( );
if (status==google.maps.DirectionsStatus.OK) {
trafficLayer.setMap(mapObject);
...
} else {
trafficLayer.setMap(null);
}
```

The above code displays the traffic layer on the map, showing the current traffic as noted as different colors on the roads (i.e. green is now traffic, yellow is somewhat congested, and red indicating a traffic jam).

```
directionsService.route(
    directionsRequest,
    function (response, status) }
        if (status == google.maps.DirectionsStatus.OK) }
            for (var i = , len = response.routes.length; i < len; i++) {
                new google.maps.DirectionsRenderer({
                    map: mapObject,
                    directions: response,
                    routeIndex: i
                });
            }
        } else {
            $("#error").append("Unable to retrieve your route<br />");
        }
    }
);
```

The looping of the response object returned in a call to the directionService.route function allows for the displaying of alternate routes returned due to current traffic. The service, directionService.route will potentially return multiple routes, which may be looped through to obtain the alternate routes.

The mapping service interaction may also provide an alternate route that is suggested due to certain elements such as road conditions or current traffic. The current application 110 residing in a transport 102 and/or a server 106 offers these options via notifications, allowing the driver to choose an alternate route.

The current weight of the transport may affect the energy consumption. It is noted that the weight change of a lighter transport makes a bigger difference that the weight change of a heaver transport.

The percent of fuel consumption effected is directly related to the size and weight of the transport. Removal of 100 pounds from a smaller transport will result in far more savings in battery usage than the removal of 100 pounds removed from a larger, heavier transport.

In one embodiment, the amount of pressure applied to each of the seats is recorded such that the system may be able to determine the additional weight of the passengers of the transport. The seats measure the amount of pressure present on the bottom cushion where the approximate weight of the occupant is calculated.

In another embodiment, the gross weight (transport, cargo, and passengers) of the transport is taken. There are multiple methods to determining the gross weight of a transport. One of the methods for weighing a transport is portable wheel axle weighing. This is the most common method for determining a car's weight because it can apply to any type of transport. In this procedure, portable scales are placed under each axle. This method is widely used because it is the cheapest but the more axles a transport has, the more units and time are required.

In another embodiment, the current gross weight of the transport is displayed on the display of the transport computer 102. This allows the driver and/or passengers to determine the current gross weight of the transport in real-time. The current weight is also used to calculate the efficiency of the transport, and/or the distance to empty. As the gross weight is altered, the transport computer 102 takes any difference in the gross weight into consideration if the delta weight is above a given threshold (e.g. 300 lbs).

Integrated methods such as sensing air suspension pressure variation, load pins, or load cells may be used to determine the total vehicle weight at rest, and thus the total weight contribution from passengers, cargo, and fuel.

If the vehicle body contains all of the passengers, cargo, and fuel weight loads, the total of these loads may be detected by the use of load cells or load pins between chassis and vehicle body.

For vehicles with an air suspension system, it is possible to determine total additional weight of passengers, cargo, and fuel by sensing the air pressure in the air line of the suspension system. Since the weight of remaining components (axle, tires, etc.) of the transport is known, the total transport weight may then be calculated.

The EPA says that for every 100 pounds taken out of the vehicle, the fuel economy is increased by 1-2 percent. This calculation is applied to the transport 102 when calculating the distance to empty.

As occupants and/or cargo are added to the transport, the additional weight may alter the efficiency of the transport, and the transport computer 102 will display the current efficiency of the transport, including the decrease in efficiency due to the difference in net and gross weight of the transport.

This may assist the user in deciding whether to add occupant(s) and/or cargo to the transport on a route as the additional occupant(s) may decrease the distance the transport may travel on the existing charge.

In another embodiment, if the additional weight of the passenger(s) and/or cargo modifies the distance such that the transport is unable to arrive at the determined destination on the current change, the transport computer 102 (via interacting with current routing technology) determines at least one intermediate destination(s) (transport charging stations) that are on or near the current route, and the intermediate destination (once selected by the driver and/or occupant) becomes the new destination where the efficiency to the transport is now relative to this new intermediate destination.

In another embodiment, the time to charge the transport (plus some additional safety charge) to arrive at the next destination is displayed and/or spoken to the occupants of the transport. This informs the occupants of the transport as to how long the transport will needed to be charged. The transport computer 102 may interact with current technology such as mapping API to determine the type of charging available at each charging station, and therefore determine the length of time necessary to charge the transport to retain the charge needed to arrive at the next destination (plus a safety charge such as 30 miles).

In yet another embodiment, sensors are added to the rear of the transport to measure the weight added for cargo. The sensors are placed in the floorboard of the cargo area and send data to the transport 102 with the added weight of the cargo added to the rear of the transport.

Wind may affect the current energy consumption along a path to a destination. Wind speed (head wind or tail wind) has a similar effect as actual driving speed. As any pilot understands, air speed and ground speed usually are different depending on winds. The higher the "air speed" the more wind resistance is experienced. Wind resistance is the main cause of mileage decrease given a determined speed. It is not the only factor, but it is probably the largest factor. This is why aerodynamic body shapes (and modifications) increase mileage in transports (drag coefficients).

A transport will always get better mileage with a tail wind and worst mileage when driving into a head wind. The faster the "air speed" the more aerodynamic drag the transport will encounter. Aerodynamic drag is by far the biggest factor in speed related mileage drops. There are also mechanical inefficiencies and friction losses, but aerodynamic drag is the largest factor.

If the transport is moving at 60 mph into a 20-mph headwind, the "airspeed" is 80 mph. If the transport is driving at 60 mph with a 20 mph tail wind, the airspeed is only 40 mph. This may make a huge difference in the mileage.

In another embodiment, a sensor is added to the transport that measures the wind data. The sensor is attached to the transport, such as the front of the transport, and sends data to a computer such as the transport computer 102. The sensor takes the wind speed and direction and the current speed of the transport is deducted from the wind data obtained by the sensor and sent to the transport computer.

Depending on the direction and speed of the wind, the efficiency of the transport may be affected. If there is a headwind, the speed of the headwind (i.e. 20 mph) deducts the efficiency of the transport such that the energy of the transport to maintain a given speed is the same as the energy of the transport to maintain the same speed+20 mph.

For example of a headwind:
Current speed (CS)=40
Headwind speed (HS)=10
Energy=CS+HS
For example of a tailwind:
Current speed (CS)=40
Tailwind speed (HS)=10
Energy=CS−HS Therefore, the transport computer 102 calculates the effect of the current wind by obtaining the current wind applied on the transport via wind detection sensors and calculates the wind-effect efficiency accordingly.

In another embodiment, winds applied on the transport from the side are calculated. For winds that are neither coming from the front (headwind) or rear (tailwind), but from another angle, the physics to calculate the effect on a transport is well documented and to dive into the specific formulas here would not benefit the reader. Therefore, it is understood that a side wind would affect a transport's efficiency and the transport computer is able to calculate this effect given the amount of wind hitting the transport. To obtain the wind data, the use of sensors are placed around the transport, sending data to the transport computer, which would then calculate the effect on efficiency.

The use of auxiliary functions in an electric transport affects the energy consumption of the transport. In the current discussion, auxiliary loads include:
Cabin heater and fan
Component heaters (ie. battery heater)
Headlights
Power steering
Radio
Mobile devices plugged in
etc. . . . .

For auxiliary loads created by original equipment installed by vehicle manufacturer, the loads may be directly measured, or they may be accurately estimated by the use of tabulated values based on the operating state of the load equipment. Devices of unknown power requirement may also be connected, and the power consumption associated with these loads must be directly measured in order to quantify their contribution to total auxiliary power load.

Determination of the effect of auxiliary power loads on available battery charge can be accomplished by measurement of the total of electrical current delivered by the power system to each of the auxiliary loads. The total auxiliary load current is the sum of each of the load currents supplied to each of the auxiliary loads. The measured current values at each auxiliary load connection are provided to the transport computer, where they may be incorporated into calculation of the energy consumption of the transport.

Figure 2:
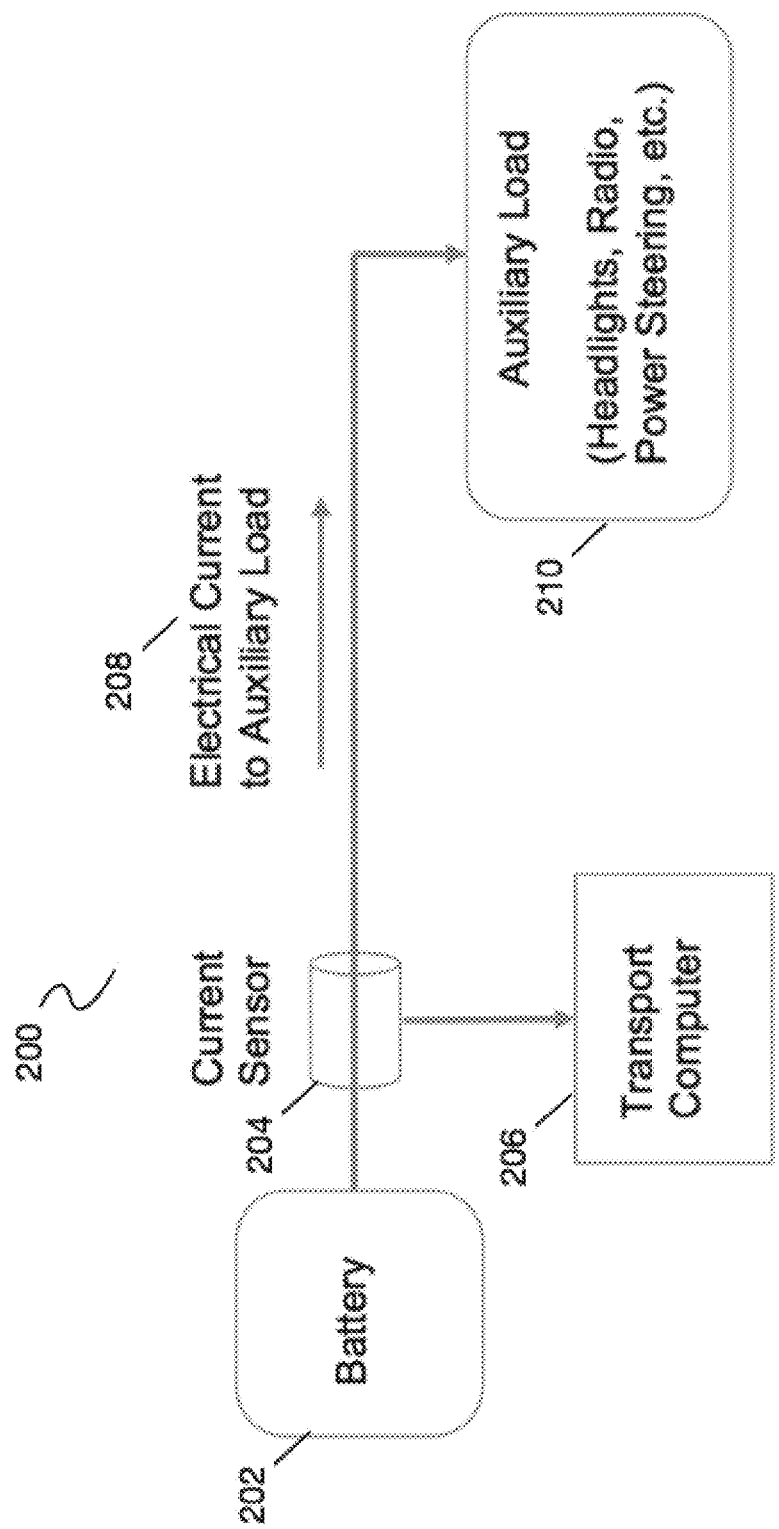
FIG. 2 illustrates a flowchart illustrating the detection of the auxiliary load in accordance with one embodiment of the present application.

With reference to FIG. 2, a flowchart illustrating the detection of the auxiliary load in accordance with one embodiment of the present application 250.

In this diagram, the system battery 202 is electrically connected to an auxiliary load 210. The auxiliary load 210 will consume power in the form of electrical current 208 according to its needs. The amount of this electrical current 208 is measured by the current sensing device 204, which commonly may be composed of a resistive current sensor, magnetic current sensor, or closed loop current sensor. The current sensor 204 proves data about the amount of current that is sent to the transport computer 206, where the electrical current data 208 may be used to calculate the rate of discharge of the battery 202.

Further subdivision of the load shown in the diagram might be possible in order to obtain more detailed information about the auxiliary load. For example, separate current measurements could be made available for the heater and fan within the climate control unit in order to enable power optimization of the unit.

Auxiliary load is something that can be measured. The use of Electric Transports in hot and cold climates shows that the use of conditioning the air has the largest effect on the use of energy. The use of air conditioning affects the efficiency of an electric transport.

The average auxiliary power load of an electric transport is lowest when the temperature of the exterior is 65 degrees. This is when the air inside the cabin is least likely to be conditioned. As all of the auxiliary functions (listed above) were calculated, it is then easy to assume that the conditioning of the air has the greatest effect on the auxiliary power usage.

The move to battery powered electric cars poses several challenges when it comes to climate control within the transport. Gone is the hugely inefficient Internal Combustion Engine (ICE) who's coolant system can easily be tapped for cabin heating while powering a 3-5 kw air conditioning compressor takes on a whole new meaning when a typical electric transport consumes only 200 watts/mile to drive down the road at highway speeds.

In an effort to improve the energy efficiency of ICEs the US department of energy has been funding development projects for Thermoelectric Vehicular Heating, Ventilation and Air Conditioning (HVAC) and for Waste Heat Recovery. There are several approaches to the problem.

The first is localized or zonal heating and cooling. Current vehicular HVAC technology heats and cools the thermal loads of the surrounding structures such as the headliner, windows, flooring, and seat backs in addition to the occupants. These systems consume between 3,500-5,000 W. To reduce this load heating or cooling can be plumbed directly into the seats. These seats are called Climate Controlled Seats (CCS) and usually feature internal ducting, a blower, and a perforated leather surface.

As the seat has direct contact with the occupant, it has much higher thermal conductivity compared to air, which is a poor conductor. With direct contact cooling or heating, load per person could be reduced to less than 700 Watts compared to 5,000 Watts to heat/cool the entire cabin.

In an electric transport with no ICE to drive the A/C compressor it has to be driven electrically much the same way as a residential air conditioner. Where some cars today have started to improve fuel efficiency with electrically driven power steering pumps and racks, the 12 v electrical system in most cars isn't powerful enough to drive a 5 kW A/C compressor. However, most electric transport battery has a 350-volt main battery with more than enough power to drive a compressor. The challenge is to reduce the load so that running the A/C doesn't overly drain the battery and dramatically reduce range.

As with residential air conditioners, variable speed compressors driven by inverters operate more efficiently, mostly because they avoid the high current drain require by repeatedly starting the electric motor driving the compressor. The combination of Climate Controlled Seats and variable speed compressor will reduce loads significantly compared to systems used on ICEs today. In addition, like residential air conditioners, with the addition of a simple valve, these A/C systems can be run in reverse cycle to provide heat as well as cooling.

Figure 3:
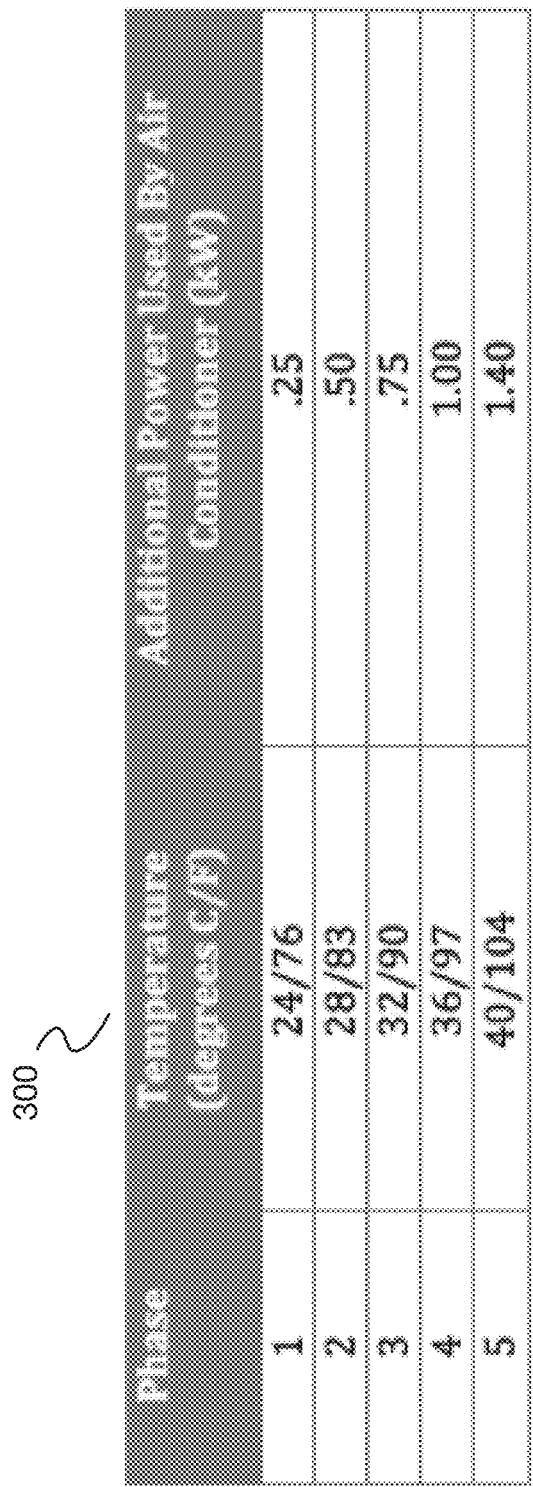
FIG. 3 illustrates a table of the load on a transport for climate control given the external temperature in accordance with one embodiment of the present application.

In super cold climates where cabin heating is essential, there may exist several utilized heat sources in an EV. An electric transport is approximately 80% energy efficient, meaning there is some waste heat available from the power electronics, the motor and battery pack. In production EVs, most of these parts have a liquid coolant system so cabin heating can be plumbed in exactly like a conventional car heater system and/or into climate controlled seats.

http://www.electric-vehiclenews.com/2009/06/how-to-power-heating-and-ac-in-electric.html With reference to FIG. 3, a table of the load on a transport for climate control given the external temperature in accordance with one embodiment of the present application 300. As can be determined from the above table, the warmer the climate the more power is used to make the cabin of the transport comfortable. This is the highest auxiliary load of any of the other auxiliary functions.

The conditioning of the air inside the cabin is a factor at outside temperatures higher than the average, comfortable temperature (i.e. 65 degrees). For lower temperatures, the heat of the engine is used to warm the cabin, thus having a negligible effect on energy consumption.

The driver of a transport that is an Electric Vehicle (EV) or a Hybrid Electric Vehicle (HEV) may need to be more aware of the power available to reach a destination than a driver of a conventional gasoline-based transport. This is due to both the amount of time necessary to recharge the batteries, and the amount of charging locations available.

The current application 110 residing in a transport 102 and/or a server 106 seeks to notify the driver of a transport of steps that may be taken to help the transport arrive at the destination on the existing battery charge or to a charging station further along the route or closer to the destination. This is accomplished by examining elements that may lower the energy consumption of the transport along the path to the destination.

In one embodiment, the traffic is analyzed along the path to the destination, alerting the driver of upcoming delays on the route, and provides alternative routes to help the transport avoid the scenario of sitting idle in traffic.

In another embodiment, the wind is analyzed to determine if a headwind is present. The driver may either choose an alternate path to the destination, or according to the weather forecast, notify the driver to take a break, allowing the weather to change to a better environment for driving that avoids a headwind.

In another embodiment, the weight of the occupants and/or cargo in the transport is analyzed to determine is decreasing the weight will allow the transport to arrive at the destination with the current battery charge.

In yet another embodiment, any auxiliary loads placed on the transport are analyzed and notifications are made. The auxiliary loads may include, but are not limited to, conditioning of the air inside the cabin, the charging of devices inside the vehicle, etc.

Electric vehicles currently inform the user of the miles that may be expected on the transport's charge. The computer does not account for other factors (many of which are covered herein).

Figure 4:
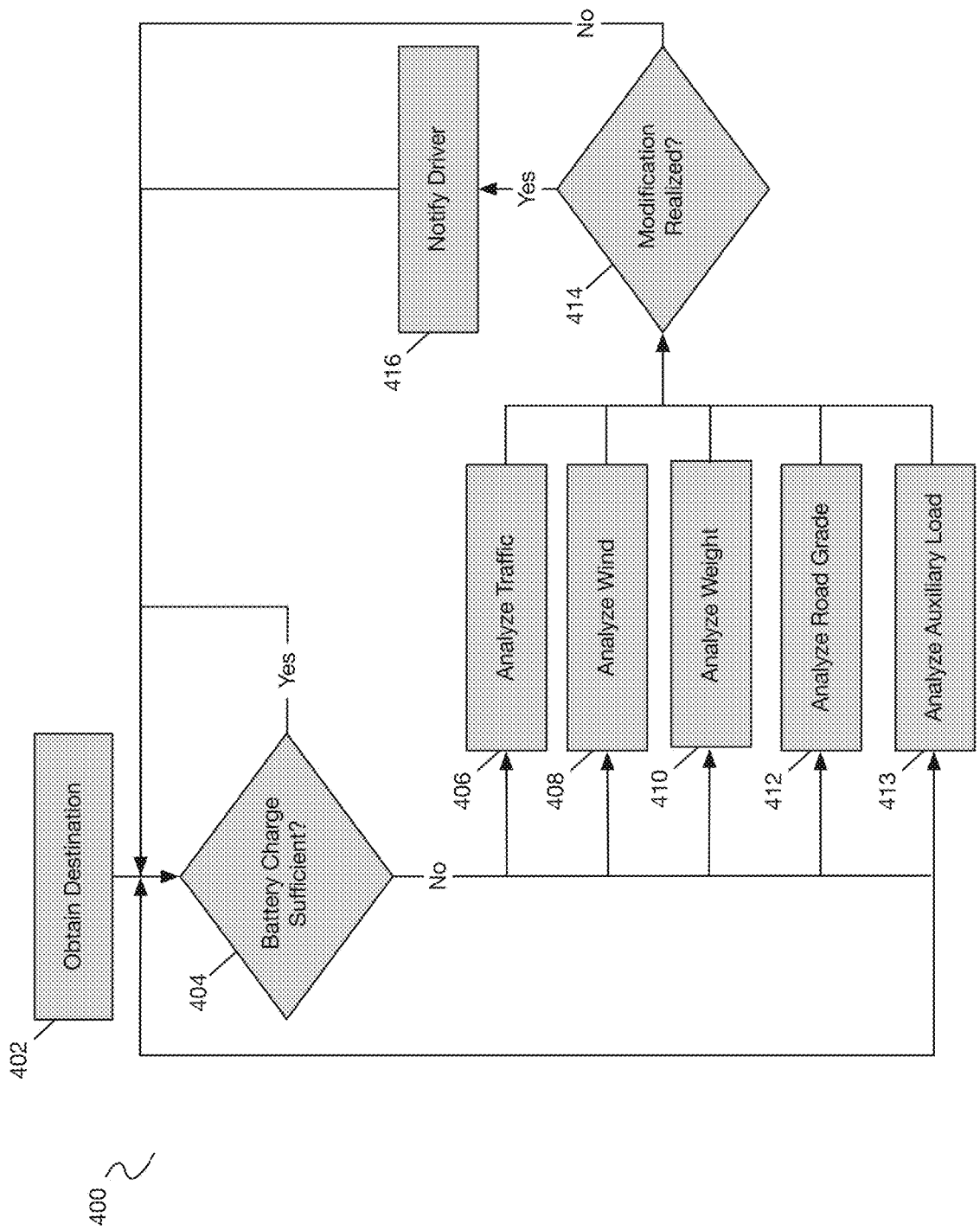
FIG. 4 illustrates a flowchart of the impacts to a transport's charge in accordance with one embodiment of the present application.

With reference to FIG. 4, a flowchart of the impacts to a transport's charge in accordance with one embodiment of the present application 400. The processing occurs on the current application 110 executing in a transport 102 and/or a server 106. The current destination is obtained 402 via the navigation system in the transport. The current application may be part of the transport's 102 navigation system, or the current application may interact with the transport's navigation system via an Application Programming Interface (API).

In another embodiment, the destination is not obtained, but at least one intermediate destination is obtained, where an intermediate destination is a destination on the route to the final destination and may be a stopping point on the route.

The transport determines if the current charge is acceptable to arrive at the destination 404. This functionality is built into the system of the transport for transports that are fully electric, thus the current application 110 residing in a transport 102 and/or a server 106 interacts with the navigation system of the transport to obtain the current charge and destination.

The current application 110 residing in a transport 102 and/or a server 106 next determines elements that may affect the range of the transport. The first element analyzed is the traffic 406. The traffic data may be obtained via interaction with the transport's navigation system, or through interaction with another application executing on the transport's computer, such as common mapping applications. Commonly used mapping applications detect traffic issues and provide alternative routes to a destination, further disclosed herein.

Given the current charge of the transport, and the determined destination, it may be necessary to avoid any traffic that may slow down and lengthen the trip. By interacting with a mapping application, any traffic scenario determined is brought to the driver's attention via the current application, thus avoiding any scenario that may add time to the destination.

The current wind pattern is analyzed 408. This information is obtained via interactions with weather APIs. The current application executing on the transport 102 queries servers via messaging routed through the network 104, obtaining current weather information. There are many weather sites existing on the network that offer an API where current weather patterns are obtainable. If there is a strong wind going against the route to the destination (i.e. greater than 25 MPH), then a notification is made to the driver. The wind may be a headwind, or a cross wind, both which affect the transport.

Interaction with a weather API, it is possible to obtain the current wind speed via an Internet connection wherein the querying of the weather is routed through the network 104. For example:

api.openweathermap.org/data/2.5/weather?zip=94040,us

The above query provides the weather given a zip code. By interworking location-based services with the current application, it is possible to obtain the current weather from the precise geographic location of the transport. The following is returned from the openweathermap server:

{"rcoord":{"lon":139,"lat":35},
"sys":{"country":"JP","sunrise":1369769524,"sunset": 1369821049},
"weather":[{"id":804,"main":"clouds","description": "overcast clouds","icon":"04n"}],
"main":{"temp":289.5,"humidity":89,"pressure":1013, "temp_min":287.04,"temp_max":292.04},
"wind":{"speed":7.31,"deg":187.002},
"rain":{"3h":0},
"clouds":{"all":92},
"dt":1369824698,
"id":1851632,
"name":"Shuzenji",
"cod":200}

The wind data returned is both the speed and direction.

The weight of the transport is analyzed 410. This information is obtained via the transport computer 102, and/or sensors in the seats of the transport.

The road grade on the route is determined 412. The road grade is determined via interaction(s) with current mapping applications where the type of road is available. Current mapping applications regularly provide the type and condition of the road.

In another embodiment, the condition of the road may be determined via the transport computer 102 analyzing the reaction of the shocks of the transport where the more bounce of the shocks relates to a more unstable road condition.

The auxiliary loads are analyzed 413. The auxiliary loads may include the following, but as previously discussed, the air conditioner puts the most of the load on the consumption of energy:

Cabin heater and fan
Component heaters (ie. battery heater)
Air conditioner (compressor)
Headlights
Power steering
Radio
Mobile devices plugged in Any device plugged into the transport will drain energy from the battery store. A mobile device will take about 1 kWh to charge. A normal mobile device battery holds a charge of 1,440 mAh, or about 5.45 watt hours.

Depending on the current charge of the transport's 102 battery, and the amount of miles to the destination, unplugging devices will aid in the discharge of the battery in-route.

The current application 110 residing in a transport 102 and/or a server 106 interworks with the transport's computer, acknowledging when a device is plugged into the transport. Devices may be plugged in a number of different methods: Universal Serial Bus (USB), Bluetooth, audio wire (i.e. 3.5 mm audio cable), etc. The connection that is of concern is the USB connection as this is one connection that pulls power from the battery to charge the device and is the single connection drawing power from the battery at a noticeable rate.

Normal gasoline vehicles recharge the battery once the engine is running via an alternator. Electric vehicles do not contain an alternator due to the amount of energy produced as compared to energy spent. Thus, any devices pulling energy to charge is utilizing possibly precious energy from the batteries.

As the air conditioner is the function that pulls the greatest amount of power from the transport's 102 battery, the conditions of when the air conditioner is most utilized is examined.

To determine the effect of the current temperature on efficiency of the transport (thus the scenario when the air conditioner is most likely used), the following code calculates the decrease in efficiency of the transport depending on the outside, current temperature:

```
switch(openweather.getWeather( ).main.temp) {
  case<83:
    efficiency=efficiency-0.50
    break;
  case<90:
    efficiency=efficiency-0.75
    break;
  case<83:
    efficiency=efficiency-1.00
    break;
  case<83:
    efficiency=efficiency-1.40
  default:
}
```

The code determines the current temperature using an openweathermap API, and then determines the average amount of efficiency lost due to the conditioning of the air in the cabin given a temperature range.

For example, the following notification is presented to the driver of the transport, informing of the distance to destination, the current range of the transport on its current charge, and finally the amount of increase in efficiency if the air conditioner is not used on route to the destination.

Figure 5A:
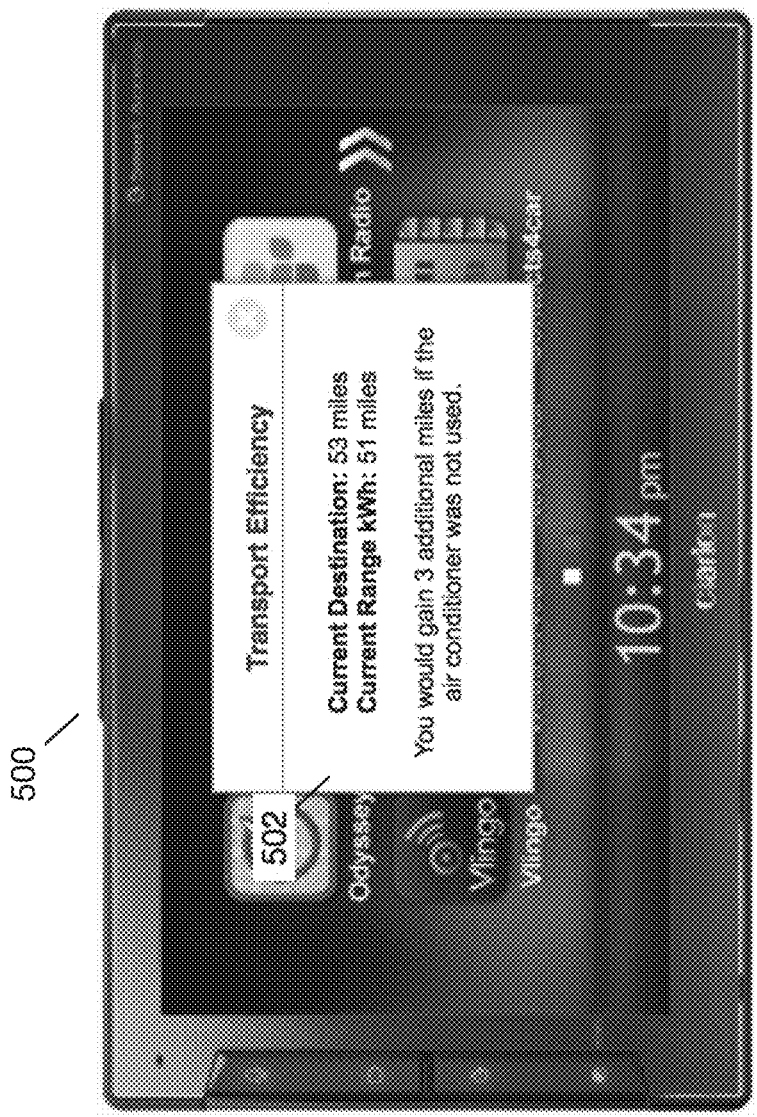
FIG. 5A illustrates a first example of the current application executing on a transport's display in accordance with one embodiment of the present application.

With reference to FIG. 5A, a first example of the current application executing on a transport's display 102 informing the driver of a possible gain in efficiency in accordance with one embodiment of the present application 500. As previously discussed, the current application 110 residing in a transport 102 and/or a server 106 determines the current range of the vehicle may be insufficient to arrive at the designated destination and therefore determines any auxiliary loads on the vehicle.

The air conditioning may be a load that may jeopardize the transport's arrival to the destination; therefore, the current application initiates a notification 502.

The notification displays the miles to current destination and the current range of the transport. This information is obtained via access to the data of the transport, and interaction with the transport's built-in computer if the current application is not executing as a part of the transport's computer.

Additionally, the current range of the transport 102 is displayed. This data is also in the transport's built-in computer and interactions with the transport's built-in computer occurs if the current application is not executing as part of the transport's computer. The current charge of the vehicle's battery system is obtained, and the data is stored in the transport's built-in computer where this data is obtained via the current application.

Finally, the number of additional miles is displayed. The additional miles are calculated by determining the current outside temperature via access to a weather API, for example. The amount of efficiency utilized to condition the air inside the cabin is determined by the current application executing on the transport computer 102, and the number of additional miles possible is displayed given the amount of efficiency determined.

The results of the above analysis are calculated 414, and if deemed necessary, the driver and/or occupants of the transport are initiated 416. The process begins again to determine the current battery charge in relation to the current destination.

The notification may be displayed on the transport's computer 102 or in another embodiment, the notification may be displayed on a device, such as the driver's mobile device. The driver's mobile device interacts with the transport's computer and is connected to the transport's computer via Bluetooth technology, or directly connected into the transport's port, such as a USB port.

Figure 5B:
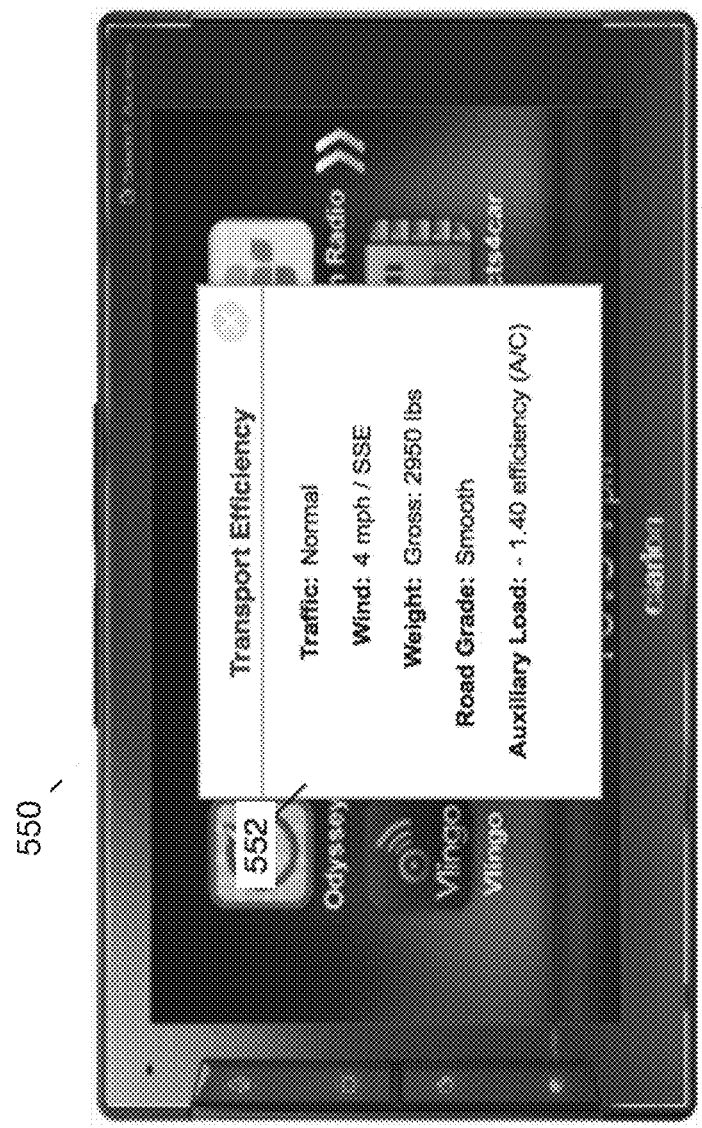
FIG. 5B illustrates a second example of the current application executing on a transport's display in accordance with one embodiment of the present application.

With reference to FIG. 5B, a second example of the current application executing on a transport's display informing the driver of the current status in accordance with one embodiment of the present application 550. The current status of each of the elements 552 potentially affecting the efficiency of the transport is listed, allowing the driver and/or occupants to easily view the current status of the elements affecting the efficiency.

In one embodiment, each of the elements listed 552 are clickable via a pointing device of the user where more details are provided on that particular element. For example, if the Auxiliary Load element is clicked, the details of the auxiliary load on the transport is listed, for example FIG. 5.

In another embodiment, the transport computer 102 alerts the user is the current battery charge of the transport falls below a determined threshold (e.g. 40 miles). This determined threshold is hardcoded in the logic of the current application executing on the transport computer 102.

The efficiency of the transport is calculated via the formula:

(energy needed to arrive at a destination)=(mass of transport)×(energy consumption)

Thus, to arrive at a given destination, there are two factors:

1. The mass of the transport
2. The amount of consumption of energy being consumed.

The weight of the transport is one factor and is displayed in the elements listed in the status of the transport. As occupants and/or cargo is added to the transport, the weight of the transport is altered, thus the efficiency of the transport given a battery charge is altered.

The amount of energy consumption is also a factor. This is determined by the other elements listed: wind, road grade, traffic, and auxiliary loads. Thus, by altering these factors, it is possible to adjust the efficiency of the transport given a current battery charge of the transport, possibly allowing the transport to arrive at a determined destination with the current charge if the energy consumption of the transport is altered, as further disclosed herein.

Figure 5C:
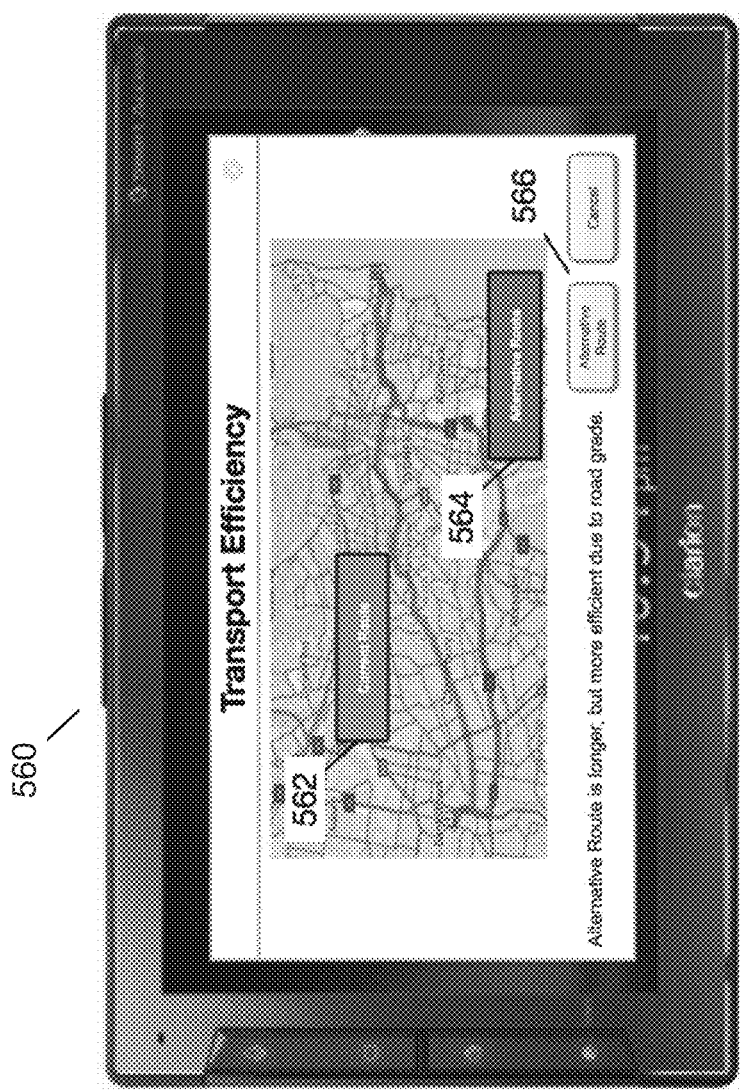
FIG. 5C illustrates a third example of the current application executing on a transport's display in accordance with one embodiment of the present application.

With reference to FIG. 5C, a third example of the current application executing on a transport's display showing an alternate route in accordance with one embodiment of the present application 560. There are two routes shown, a green route 562, and a dark green route 562. The system has detected two routes via interfacing with mapping applications as further disclosed herein. The system displays both routes, along with information pertaining to the rationale of the alternative route. The routes are labeled as to easily detect the original route 562, and the alternative route 564.

The user is able to select the alternative route as the route to the destination by clicking on an "Alternative Route" button 566 or dismiss the alternative route window by clicking a "Cancel" button 566.

Further interactions are possible by clicking on the elements of the display.

Figure 5D:
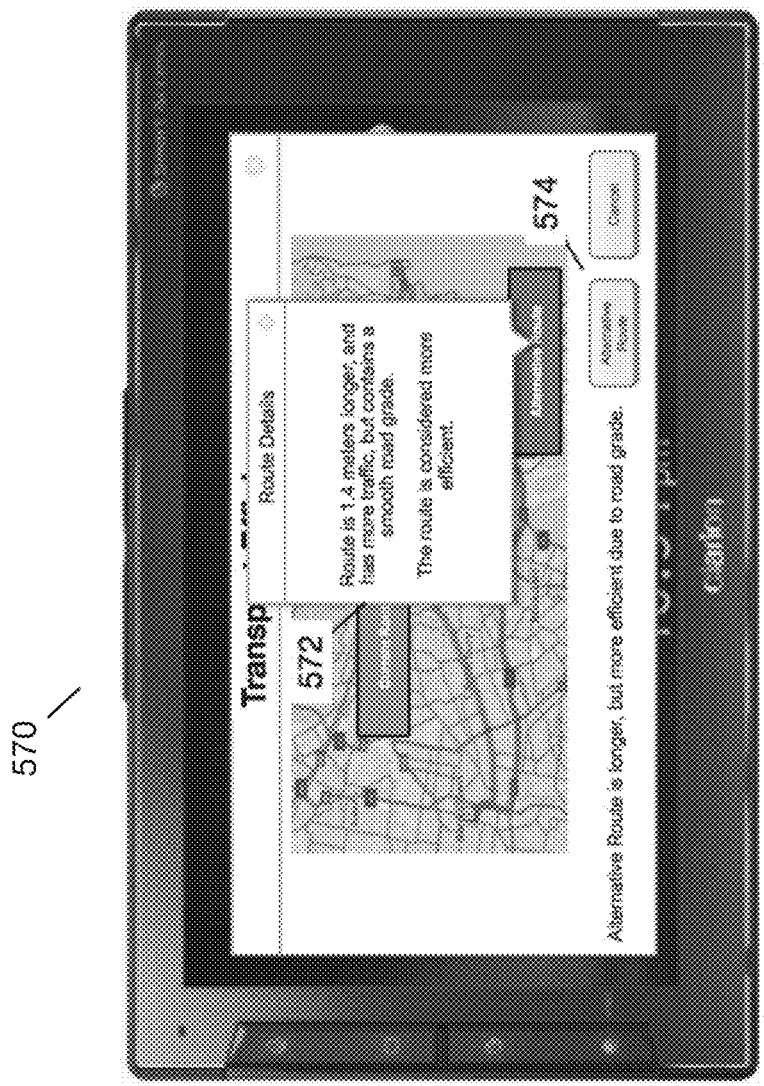
FIG. 5D illustrates a fourth example of the current application executing on a transport's display in accordance with one embodiment of the present application.

With reference to FIG. 5D, a fourth example of the current application executing on a transport's display showing the details of an alternate route in accordance with one embodiment of the present application 570. The system displays additional data 572 when the route description window 564 is clicked on via the pointing device of the user (e.g. the user's finger). The additional data is displayed in a route details window 572 where further details are provided of the alternative route.

The system has determined that an alternative route may be preferred over the current route, as the alternative route has road grades that are smoother than the current route. This raises the efficiency of the transport.

The user has the open to choose the alternative route by clicking an "Alternative Route" button 574 or dismiss the window by clicking a "Cancel" button 574.

In another embodiment, the system may determine that an alternate route is advisable, even though the transport heads directly into a headwind. For example, if a closer charging station is available on an alternate route, with a direct head wind, then it may be advisable for the transport to take the alternate route.

Figure 5E:
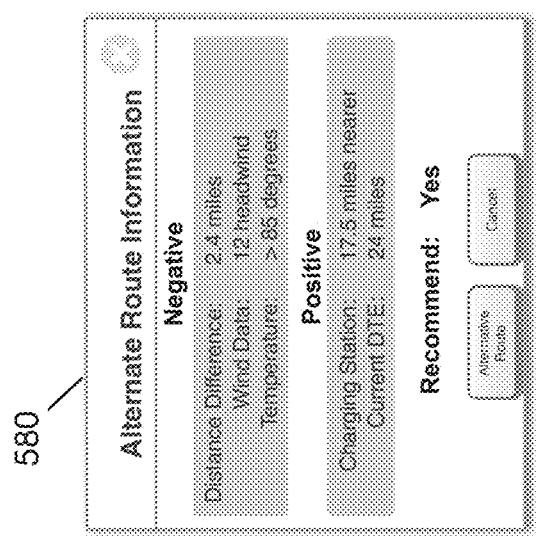
FIG. 5E illustrates a fifth example of the current application executing on a transport's display in accordance with one embodiment of the present application.

With reference to FIG. 5E, a fifth example of the current application executing on a transport's display informing the driver of details of an alternate route in accordance with one embodiment of the present application 580. In this example, an alternative route has been advised where the negative and positive attributes of the alternate path is shown. A recommendation is provided as well.

The change in efficiency is also determined to be a factor, as the temperature is greater than 85 degrees, and the auxiliary load (e.g. the conditioning of the air inside the cabin of the transport) placed on the transport will be affected. For more information, see further logic herein.

The user has the open to choose the alternative route by clicking an "Alternative Route" button or dismiss the window by clicking a "Cancel" button.

In another embodiment, sensors in the transport, further disclosed herein, determine the addition of weight to the transport. The addition of the weight (via extra cargo and/or additional occupants) alters the efficiency of the transport. The system executing on the transport 102 displays the additional charging time needed for the extra weight added and displays this to the user via the display of the transport.

For example, the following is displayed:

"198 lbs. have been added to the transport. The additional weight will require 18 minutes of additional charge."

The logic of determining the additional charge is calculated by increase in mass of the transport as previously depicted (energy needed=mass×energy consumed).

In another embodiment, the current application notifies the driver and/or occupants of the transport messages related to connected devices. Devices may be connected to the transport via at least three different methods:

Wirelessly via Bluetooth protocol
Wired via a USB port
Wired via a 3.5 mm audio cable Data is normally obtained from the connected device when a device is connected to the transport, such as when the device is connected wirelessly via Bluetooth technology and when the device is connected via a USB port. The data normally collected is the current battery charge of the device as well as the device name (e.g. John's iPhone).

Figure 6:
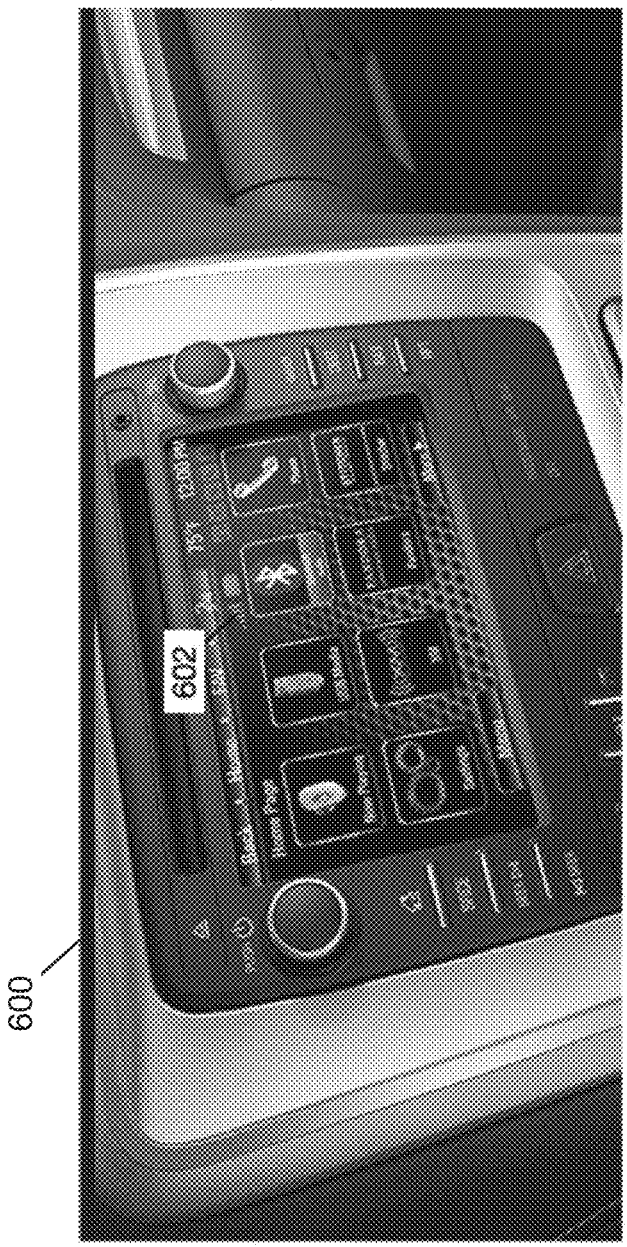
FIG. 6 illustrates a sixth example of the current application executing on a transport's display in accordance with one embodiment of the present application.

With reference to FIG. 6, a sixth example of the current application executing on a transport's display showing the current mobile device battery charge in accordance with one embodiment of the present application 600. The transport's 102 computer displays the current charge of a connected device 602. The transport computer displays the current charge of the connected device whether the device is connected to the transport via Bluetooth technology (wirelessly) or via USB port (wired).

If the current application 110 residing in a transport 102 and/or a server 106 determines that the transport's current battery charge is unable to provide the needed charge to reach the destination, or if the current charge is nearly able to reach the destination, the current application will calculate the amount of charge of the connected device of which are pulling energy from the transport's battery (charging the connected device), and offer suggestions on how to limit the amount of energy utilized to charge the connected devices.

Figure 7:
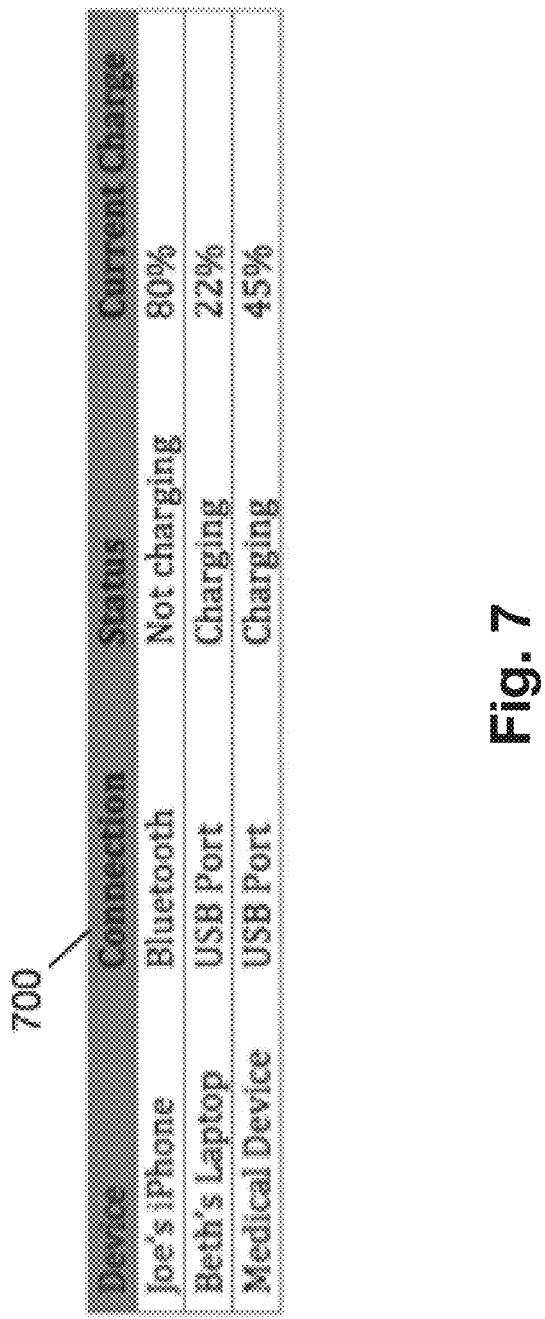
FIG. 7 illustrates a table of connected devices in accordance with one embodiment of the present application.

For example, there are three connected devices. Two of the devices are connected to USB ports of the transport, and one is connected wirelessly via Bluetooth technology. The connected devices are listed below:

With reference to FIG. 7, a table of connected devices in accordance with one embodiment of the present application 700. There are many types of devices that may be plugged into a transport, including medical devices such as a portable oxygen-delivering machine and any other type of portable medical devices that may be used to monitor health.

In one embodiment, the current application 110 residing in a transport 102 and/or a server 106 notifies the driver and/or occupants that the charging of connected devices may not be beneficial, due to the amount of battery charge of the transport in relation to the amount of distance to the destination.

In another embodiment, the Device may be a different type of computing device, such as virtual reality glasses, a laptop, a tablet, a wearable such as a watch, or any device that is able to to connect to another system via wired or wireless technology.

Figure 8:
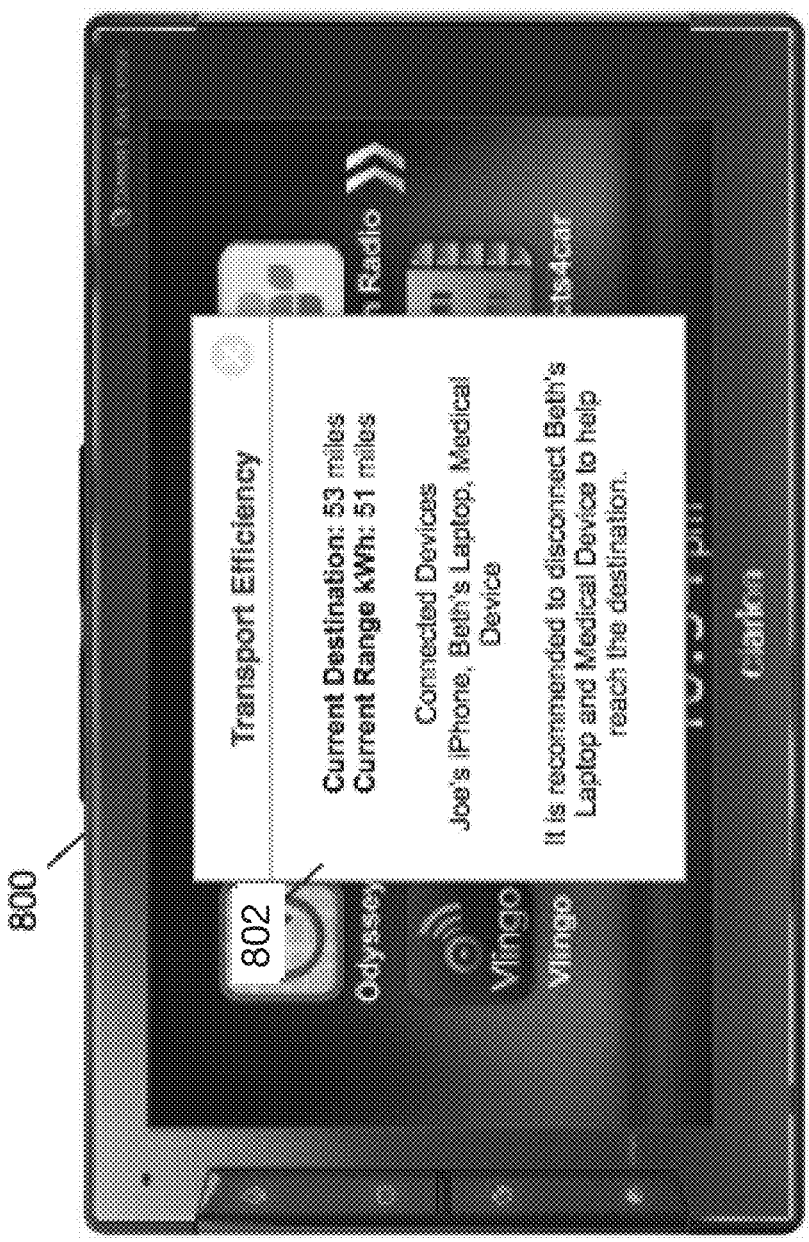
FIG. 8 illustrates a seventh example of the current application executing on a transport's display in accordance with one embodiment of the present application.

With reference to FIG. 8, a seventh example of the current application executing on a transport's display in accordance with one embodiment of the present application 800. A notification 802 is displayed on the displaying the miles to current destination and the current range of the transport. This information is obtained via access to the data of the transport, and interaction with the transport's built-in computer if the current application is not executing as a part of the transport's computer.

Additionally, the current range of the transport is displayed. This data is also in the transport's built-in computer and interactions with the transport's built-in computer occurs if the current application is not executing as part of the transport's computer. The current charge of the vehicle's battery system is obtained, and the data is stored in the transport's built-in computer where this data is obtained via the current application.

Finally, the number of additional miles is displayed. The additional miles are calculated by determining the current outside temperature via access to a weather API, for example. The amount of efficiency utilized to condition the air inside the cabin is determined by the current application executing on the transport computer, and the number of additional miles possible is displayed given the amount of efficiency determined.

The connected devices are displayed. The transport computer 102, as normally determined by current software in transport computers, obtains the names of the devices. This name is displayed in the notification 702, allowing the reader(s) of the notification to relate which connected device belongs to which user.

Finally, the recommendation is displayed as to which devices to disconnect. The devices include those devices currently being charged.

In another embodiment, the system displays the effect of the charging time if the devices are left plugged in and charging. For example, the following notification is presented on the display of the transport:

"The charging devices may remain; the effect is an additional 17 minutes of charging."

The system determines the amount of charge pulled from the transport to charge the devices for the amount of time from the current time, to the determined time to reach the next charging station, or destination. This allows for the determination of the amount of additional charging time to account for the charging of the plugged-in devices.

What is claimed is:

1. A system, comprising:
   a navigation system configured to obtain a current destination;
   a processor communicably coupled to the navigation system,
   wherein the processor is configured to determine whether the transport has battery charge to arrive at a final destination; and
   an application communicably coupled to the processor configured to determine one or more variables that affect a range of the transport; when the processor determines that the battery charge is insufficient to arrive at the final destination, the processor is configured to:
   provide a notification of the insufficiency of the battery charge;
   provide information corresponding to the one or more variables;
   process a modification of the one or more variables to reduce a rate of consumption of the battery charge; and
   provide a notification of a sufficiency of the battery charge to arrive at the final destination, if possible, based on the modification, wherein the processor is configured to determine an intermediate destination when the battery is insufficient to arrive at the final destination, the intermediate destination including a battery charging station identified based on information received from a server and being at least one of a destination on a route to the final destination and a stopping point on the route.

2. The system of claim 1, wherein the processor is configured to provide a notification of at least one of
   a sufficiency of the battery charge to arrive at the intermediate destination, and
   an insufficiency of the battery charge to arrive at the intermediate destination.

3. The system of claim 1, wherein the application is configured to interact with the navigation system of the transport to obtain the battery charge and the destination, and wherein the application resides in at least one of: the transport, and a server communicably coupled to the transport.

4. The system of claim 1, wherein the one or more variables comprise at least one of: traffic, wind, weight, road grade, and an auxiliary load of at least one device of the transport.

5. The system of claim 1, wherein the processor is configured to perform one or more of:
   provide a notification of the battery charge based on modification of one or more of the variables; and
   provide details of an amount of the battery charge to reach sufficiency.

6. The system of claim 1, comprising a display, wherein the processor is configured to provide a notification of an alternate route via the display, a negative attribute of the alternate route, a positive attribute of the alternate route, and a recommendation related to the alternate route, and wherein the positive attribute has an effect of increasing the range and the negative attribute has an effect of reducing the range.

7. The system of claim 6, wherein the recommendation is related to the battery charge.

8. A method, comprising:
   obtaining a current destination by a navigation system in a transport;
   determining whether the transport has battery charge to arrive at a final destination by a processor communicably coupled to the navigation system;
   determining one or more variables that affect a range of the transport by an application communicably coupled to the processor;

determining by the processor that the battery charge is insufficient to arrive at the final destination; wherein the processor is configured to perform:

providing a notification of the insufficiency of the battery charge;

providing information corresponding to the one or more variables;

processing a modification of the one or more variables to reduce a rate of consumption of the battery charge; and providing a notification of a sufficiency of the battery charge to arrive at the final destination, if possible, based on the modification, wherein the processor is configured to determine an intermediate destination when the battery is insufficient to arrive at the final destination, the intermediate destination including a battery charging station identified based on information received from a server and being at least one of a destination on a route to the final destination and a stopping point on the route.

9. The method of claim 8, further comprising providing, by the processor, a notification of at least one of a sufficiency of the battery charge to arrive at the intermediate destination, and an insufficiency of the battery charge to arrive at the intermediate destination.

10. The method of claim 8, wherein the application is configured to interact with the navigation system of the transport to obtain the battery charge and the destination, and wherein the application resides in at least one of: the transport, and a server communicably coupled to the transport.

11. The method of claim 8, wherein the one or more variables comprise at least one of: traffic, wind, weight, road grade, and an auxiliary load of at least one device of the transport.

12. The method of claim 8, wherein the processor is configured to perform one or more of:

providing a notification of the battery charge as the one or more variables are is modified; and providing details of an amount of the battery charge to reach sufficiency.

13. The method of claim 8, further comprising providing, by the processor, a notification of an alternate route via a display, a negative attribute of the alternate route, a positive attribute of the alternate route, and a recommendation related to the alternate route, and wherein the positive attribute has an effect of increasing the range and the negative attribute has an effect of reducing the range.

14. The method of claim 13, wherein the recommendation is related to the battery charge.

15. A non-transitory computer readable medium comprising instructions, that when read by a processor, cause the processor to perform:

obtaining a current destination by a navigation system in a transport;

determining whether the transport has battery charge to arrive at a destination by a processor communicably coupled to the navigation system;

determining one or more variables that affect a range of the transport by an application communicably coupled to the processor;

determining by the processor that the battery charge is insufficient to arrive at the destination; wherein the processor is configured to perform:

providing a notification of the insufficiency of the battery charge;

providing information corresponding to the one or more variables;

processing a modification of the one or more variables to reduce a rate of consumption of the battery charge; and providing a notification of a sufficiency of the battery charge to arrive at the final destination, if possible, based on the modification, wherein the processor is configured to determine an intermediate destination when the battery is insufficient to arrive at the final destination, the intermediate destination including a battery charging station identified based on information received from a server and being at least one of a destination on a route to the final destination and a stopping point on the route.

16. The non-transitory computer readable medium of claim 15, wherein the destination is a final destination and wherein the instructions cause the processor to determine at least one intermediate destination, the intermediate destination being at least one of:

a destination on a route to the final destination; and a stopping point on the route.

17. The non-transitory computer readable medium of claim 16, comprising instructions that when read by the processor, cause the processor to perform providing a notification of at least one of a sufficiency of the battery charge to arrive at the intermediate destination, and an insufficiency of the battery charge to arrive at the intermediate destination.

18. The non-transitory computer readable medium of claim 15, wherein the application is configured to interact with the navigation system of the transport to obtain the battery charge and the destination, and wherein the application resides in at least one of: the transport, and a server communicably coupled to the transport.

* * * * *